Inventor
Robert A. Schafer
By Williams, Bradbury,
McCaleb & Hinkle.
Attys.

Patented July 15, 1941

2,249,230

UNITED STATES PATENT OFFICE 2,249,230

WORK LOCATING MECHANISM FOR MACHINE TOOLS

Robert A. Schafer, Richmond, Ind., assignor to The National Automatic Tool Company, Richmond, Ind., a corporation of Indiana Application July 26, 1939, Serial No. 286,555

8 Claims. (Cl. 77—3)

My invention relates generally to multi-unit machine tools, and more particularly to improved means for advancing and locating work to be machined in proper position to be operated upon by machine tool units.

In multi-unit machine tools in which the work pieces are successively conveyed to and located in positions for having operations performed upon them by the different machine tools, difficulty has frequently been experienced in the past, due to slight errors in the location of the various units along the work conveying and locating mechanism. Such slight mis-alignment and irregularities in the spacing of the units result from unavoidable irregularities in the floors or foundations upon which the units are mounted, and upon other not readily avoidable dimensional variations, especially when the units are large and heavy. As a result, the mechanism used to carry the work pieces from one unit to another may not always position the work pieces in exactly correct relationship with respect to the different units, with consequent difficulty in securing proper operation of the means by which the work pieces are finally located in the proper positions adjacent the various units.

It is thus an object of my invention to provide an improved indexing mechanism for multi-unit machine tools which will be operative to move the work pieces accurately into position to be engaged by the final locating means, despite minor irregularities in the positions and spacing of the units.

A further object is to provide an improved indexing mechanism for multi-unit machine tools in which the distance the work piece is moved from unit to unit may be determined by the spacing of the units.

A further object is to provide an indexing mechanism for multi-unit machine tools in which common means are provided for successively indexing the work pieces to locating position adjacent the various machine tools, and in which adjustable means are provided whereby the indexing mechanism may move the work pieces different distances, depending upon the spacing of the units.

A further object is to provide an improved compensating traveling pawl indexing mechanism which makes allowances for irregularities in the spacing of the locating positions to which the work pieces are to be moved.

Other objects will appear from the following description, reference being had to the accompanying drawings in which.

Figure 1:
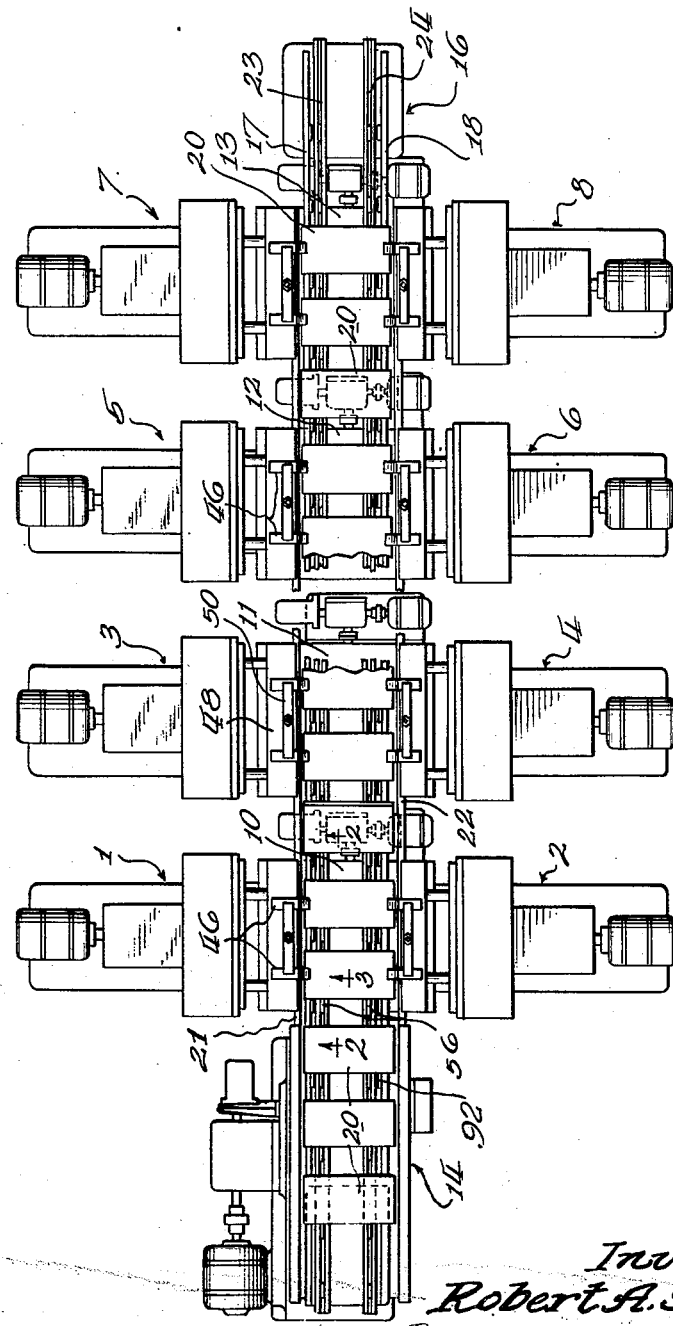
Figure 1 is a plan view of a multi-unit machine tool of the type in which my invention may be incorporated with advantage.

As shown in Fig. 1, the machine tool comprises a plurality of units 1 to 8, inclusive, the bases of which are suitably secured to a foundation or floor. The opposed ends of the bases of the units 1 and 2 are secured together by a frame casting 10, while units 3 and 4, 5 and 6, and 7 and 8 are similarly connected by frame castings 11, 12 and 13. Loading station 14 is provided at one end of the row of units, while an unloading station 16 is provided at the other end of this row of units.

Extending longitudinally between the pairs of units are a pair of rest rails 17 and 18, upon which the work pieces 20 are supported. In addition, there are provided guide rails 21 and 22 to aid in guiding the work pieces 20 as they are indexed along the rest rails 17 and 18. A pair of indexing rails 23, 24 extend longitudinally the full length of the complete machine, and are longitudinally reciprocable through a distance slightly greater than that represented by twice the spacing of the work pieces 20, so as to successively advance the work pieces along the rest rails 17, 18, and thereby position these work pieces properly for engagement by exact locating and clamping means which are associated with each of the units.

Figure 3:
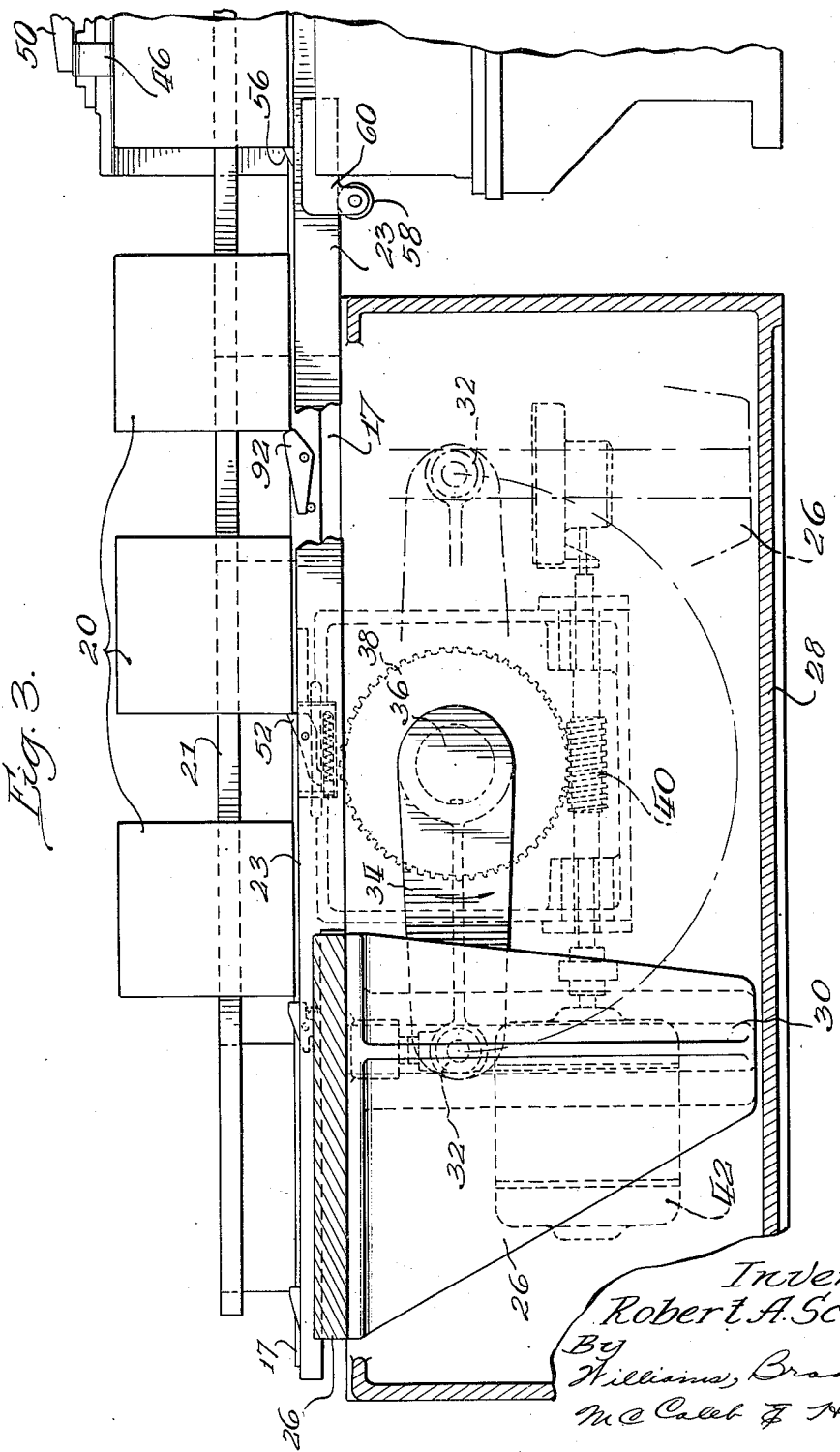
Figure 3 is an enlarged sectional view of the loading platform and index driving mechanism taken on the line 3—3 of Figure 1.

As best shown in Fig. 3, the means for reciprocating the indexing rails 23, 24 comprises a slide bracket 26 which is suitably guided for horizontal reciprocatory movement on suitable ways formed on a loading station frame 28. The slide bracket 26 has a depending slot to receive a roller 32, the roller being suitably attached to the end of a crank arm 34 which is keyed to a shaft 36, the latter having a worm wheel 38 secured thereto, and the worm wheel being driven from a worm gear 40 by an electric motor 42. The motor is driven in one direction to swing the crank arm 34 counter-clockwise through an angle of approximately 180°, thus bringing the crank arm 34 and slide bracket 26 to the positions in which they are indicated in dotted lines in Fig. 3.

Controlling means are provided to interrupt the supply of current to the motor 42 when the crank arm has reached its dotted line position, and after a suitable timed interval, controlled by suitable interlocks, cause the motor to operate in a reverse direction, thereby to return the crank arm to the position in which it is shown in full lines in Fig. 3.

The indexing rails 23, 24 are rigidly secured to the slide brackets 26, and are thus reciprocated thereby. The throw of the crank 34 is slightly greater than the distance between the spacing of alternate work pieces 20, as these work pieces are shown in Fig. 1. This indexing mechanism is disclosed in greater detail and claimed in the copending application of Charles H. Muhl et al., Serial No. 270,192, filed April 26, 1939. This mechanism need therefore not be described in greater detail here, since for the purposes of the present invention, any suitable means for reciprocating the indexing rails 23, 24 may be employed.

Figure 5:
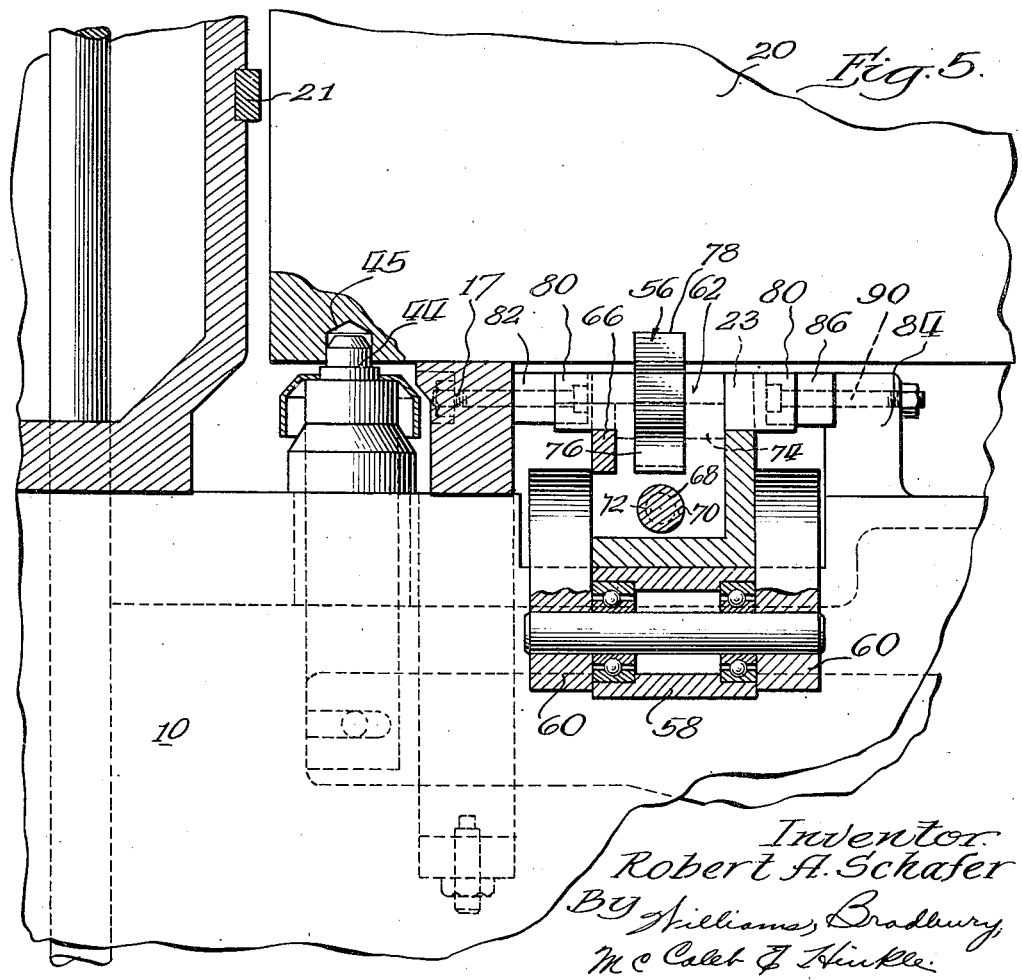
Figure 5 is a fragmentary vertical sectional view showing the traveling pawl mechanism and taken on the line 5—5 of Figure 2.

As likewise disclosed in greater detail in the aforesaid application, the work pieces 20 which may, for example, be cylinder blocks for internal combustion engines, are automatically located and clamped in their respective positions adjacent the machine tool units. This means is disclosed herein as comprising a pair of locating pins 44 which are automatically raised to the position in which one of these pins is shown in Fig. 5 after the cylinder block 20 has been moved to proper position adjacent the machine tool unit which is to operate upon it. The pins 44 fit in locating holes 45 formed in the cylinder block 20.

Figure 2:
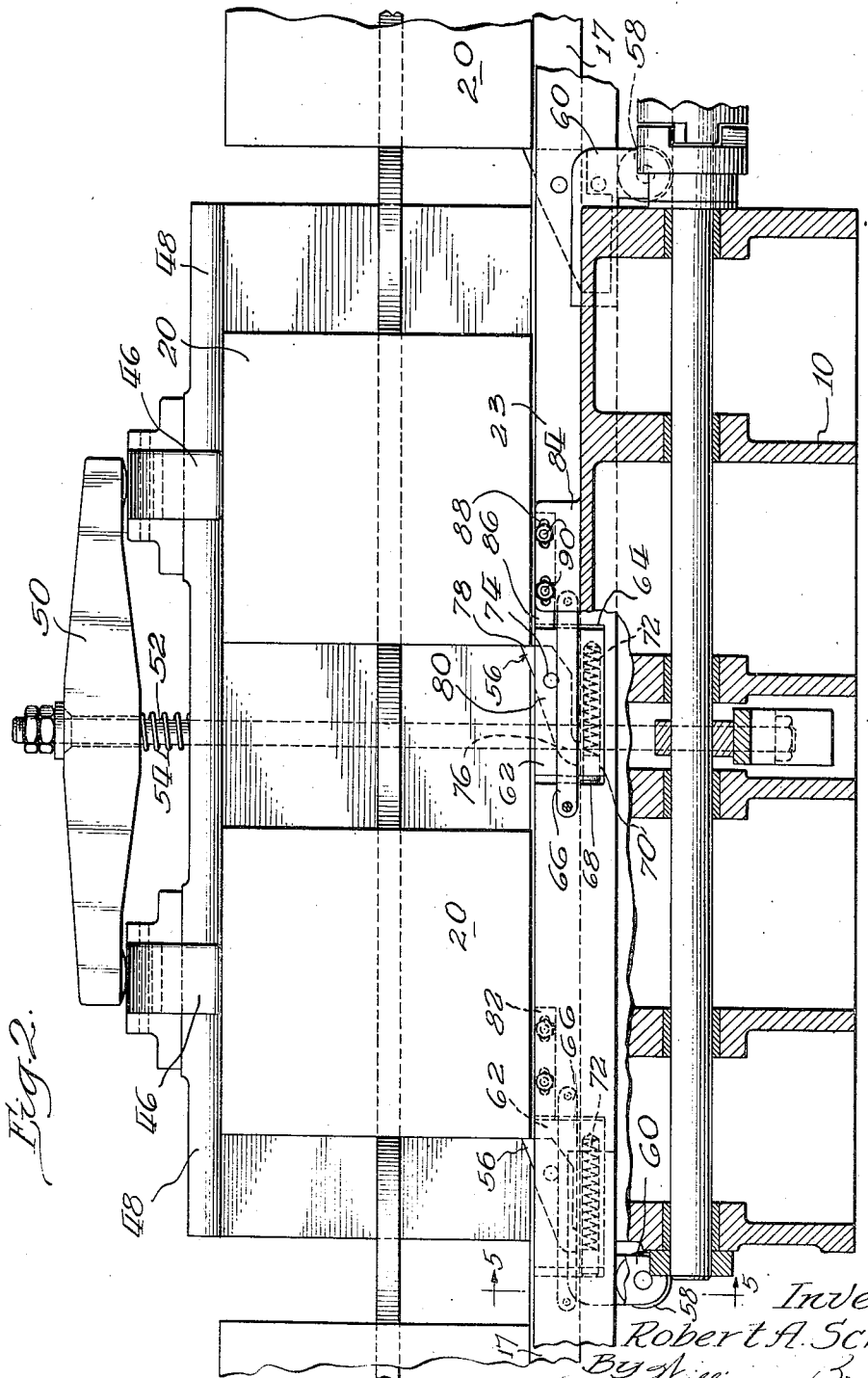
Figure 2 is an enlarged fragmentary longitudinal sectional view taken on the line 2—2 of Figure 1.

After the locating pins 44 have entered the suitable locating holes 45 formed in the cylinder block 20, clamping means, best shown in Fig. 2, are operated to clamp the work in its located position. This clamping means may comprise a pair of spring-returned clamping arms 46 which are suitably pivoted to the upper frame 48 of the intermediate frame 11, and are adapted to be swung downwardly into engagement with the work pieces 20 by an equalizing beam 50 which is pulled downwardly by a rod 52, a compression coil spring 54 surrounding the rod 52 being provided to aid in returning the beam to its upper clamp-releasing position.

The indexing rails 23, 24 are each provided with a plurality of pawls 56 which are adapted to engage the cylinder blocks 20 during the forward (rightward, Figs. 1, 2 and 3) travel of the indexing rails, and thus push the work pieces 20 a distance corresponding substantially to the throw of the crank arm 34. In prior constructions, as shown, for example, in the aforesaid application, the pawls 56 were pivoted to the indexing rails 23 and 24, so that upon each reciprocatory stroke of these rails, the work pieces were advanced definite equal distances.

As previously mentioned, difficulty was encountered in some installations, due to the fact that the pairs of units 1—2, 3—4, 5—6 and 7—8 were not spaced apart exactly the distances necessary to cause the work pieces to be positioned with their locating holes 45 directly above the locating pins 44. Thus when the locating pins were raised, they engaged the bottom of the casting, raising the casting from the rest rails 17, 18, and thereby improperly positioning the work pieces, with resulting damage to the work pieces and danger of breakage of tools.

Figure 4:
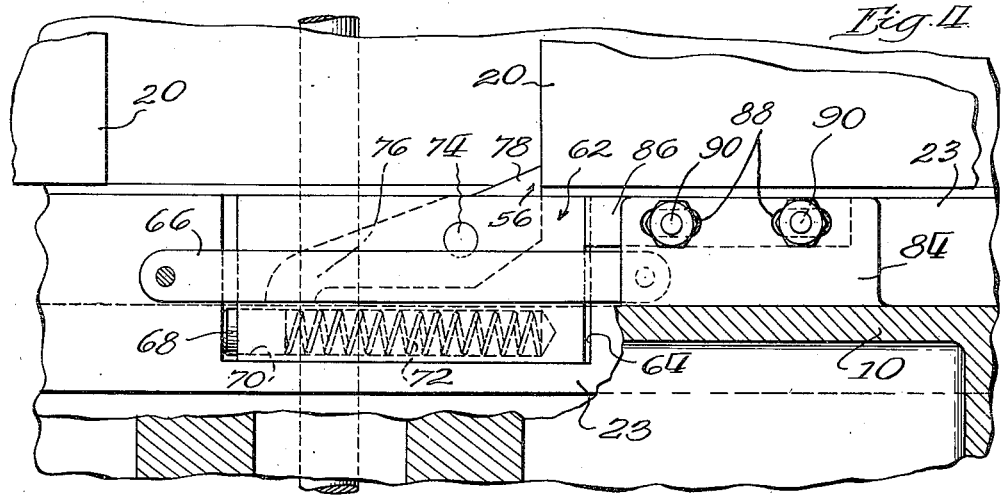
Figure 4 is an enlarged fragmentary sectional view showing particularly the traveling pawl mechanism.

To overcome this difficulty, the pawls 56 are movably mounted upon the indexing rails in a manner such as to compensate for such possible irregular spacing of the machine tool units. As best shown in Figs. 2, 4 and 5, the indexing rail 23 is mounted for longitudinal reciprocatory movement on a plurality of rollers which are suitably supported by brackets 60 secured to the frames 10 to 13. A pawl carrier 62 is mounted for limited sliding movement in a recess 64 formed in the rail 23, the block being held in said recess by a plate 66 which is suitably secured to the rail 23.

The pawl carrier 62 is normally held in its rightmost position in the recess 64 by a plunger 68 which is slidable in a socket bore 70 formed in the pawl carrier 62, and is pressed outwardly by a relatively strong compression coil spring 72 confined within the socket bore. The pawl 56 is pivotally mounted on the pawl carrier 62 by a pin 74, the pawl having a rearwardly extending tail portion 76 which normally holds the nose portion 78 of the pawl above the level of the top of the indexing rail 23, due to the fact that the nose end portion 78 is lighter than the tail portion 76 of the pawl.

The pawl carrier 62 has a sidewardly extending portion 80 which is adapted to engage with a fixed stop 82 which is adjustably secured either to the rest rail 17 as shown in Fig. 5, or may be secured to an upwardly extending boss forming part of the intermediate frame casting 10, as best shown in Fig. 4, wherein the stop bears the reference character 86. The stops 82 and 86 are preferably provided with elongated slots 88 to receive bolts 90 by which the stops 82, 86 may be secured in any desired position of adjustment permitted by the elongated slots 88. In the construction herein disclosed, the successive pawl carriers 62 along the indexing rail 23 will have their stop engaging portions 80 located alternately on opposite sides. For example, in Fig. 2, one stop carrier 62 has its stop engaging projection 80 located at the left side, for engagement with an adjustable stop 82 secured to the rest rail 17, whereas the following pawl carrier 62 will have its stop engaging projection 80 upon the right side for engagement with an adjustable stop 86 secured to the boss 84 of the frame 10.

In operation, after all of the units 1 to 8 have been secured to the foundation or floor, in as accurately aligned and spaced relation as may be obtained without excessive care as to the precision of their placement, the stops 82 and 86 are adjusted so that the pawl carrier stop portions 80 will engage these stops respectively and arrest the movement of the carriers in such position that the blocks 20 being advanced by these pawls are positioned with their locating holes 45 directly above the locating pins 44. Such arrest of the pawl carrier 62 is permitted by virtue of the yielding of the compression spring 72 associated therewith.

The adjustment of the stops 82 and 86 will, of course, be made individually, so that irrespective of minor variations in the distances between the units, the indexing rails 23, 24 will advance the cylinder blocks 20 exactly to their respective positions for engagement by the machine tools. It will be understood that for this reason the stroke of the indexing rails 23, 24 will be sufficiently great to be capable of advancing all of the work pieces 20 slightly beyond the positions at which the work pieces are to be located, so that in each instance, the stop 82 or 86 will be effective to arrest the associated pawl 56 in the required position.

Upon retractile movement (to the left, Figs. 1, 2 and 4) of the indexing rails 23, 24, the pawls 56 will pivot clockwise, so as to pass beneath the located work pieces without disturbing the positions of the latter.

In view of the location of the stops 82 and 86 alternately upon opposite sides of the indexing rails, the latter may move freely during their retractile stroke without having the projecting stop portions 88 of the pawl carrier 62 engaging the stop members.

It will be understood that the indexing rails, upon each reciprocation, advance the work pieces 20 a distance corresponding to the spacing of alternate work pieces. The retractile stroke of the indexing rails 23, 24 is sufficiently great so that the pawls 56 will properly engage behind the next group of work pieces to be advanced through the machine.

To prevent possible retractile movement of the work pieces 20 positioned on the rest rail at the loading station, suitable stop pawls 92 (Fig. 3) are secured to the rest rails 17 and 18.

It will be understood that each of the units 1 to 8, inclusive, comprises a self-contained machine tool with its individual driving motor, hydraulic and electric controls for traversing, feeding, and reverse traversing, and that these units are interconnected, preferably electrically, by interlocks, so that all of the units, together with the indexing and clamping means, operate in proper sequence. Briefly, this sequence may be described as follows:

(a) The indexing mechanism advances the cylinder blocks a distance represented by the spacing between alternate blocks, and the blocks are arrested in provisionally located position by the stops 82 and 86. In the arrangement illustrated, each machine tool unit operates simultaneously to perform similar operations upon two blocks.

(b) After the blocks have been advanced to their operating stations between the pairs of units 1 to 8, the interlocked controls cause operation of the locating pins 44 and the clamps 46.

(c) After the work has been located and securely clamped in position, the indexing rails are retracted so as to enable the attendant to place an additional pair of cylinder blocks thereupon at the loading station.

(d) After the cylinder blocks have been clamped into position, the individual units are rendered operative to commence their operations of drilling, reaming, boring, tapping, facing, etc., upon the cylinder blocks. Each unit operates upon its own cycle, depending upon the operations to be performed.

(e) After all of the units 1 to 8 have completed their machining operations, the clamps 46 are released and the locating pins 44 withdrawn from the holes 45 in the cylinder blocks, so that after the completion of this operation, the machine is in condition to commence another indexing operation.

It will be noted that every third cylinder block is in an idle position between the pairs of the units 1 to 8. However, since the blocks are advanced twice the distance between the blocks upon each operation of the indexing mechanism, it will be apparent that each of the blocks will be indexed so as to be positioned in one or other of the stations of each of the pairs of units.

It is because of the fact that the blocks are moved a distance equal to twice their spacing upon each indexing operation that it is necessary to provide the sidewardly extending stop portions 88 of the pawl carrier 62 alternately upon opposite sides of the carrier so as to avoid interference during the indexing operation.

It will be understood that while I have disclosed my invention as incorporated in a particular form of multi-unit machine tool, the underlying principles thereof may be utilized in other types of machine tools, and that considerable variation in the form and construction of the parts may be made, as will be apparent to those skilled in the art, without departing from these underlying principles.

I therefore desire by the following claims, to include within the scope of my invention all such similar or equivalent constructions whereby substantially the results of my invention may be obtained in substantially the same way.

I claim:

1. In a machine tool having a plurality of stations at which machining operations are to be performed upon work pieces and means at said stations for locating and clamping said work pieces in position, indexing means operable to advance work pieces successively to different stations, said means comprising a member having a to and fro movement, a pawl carrier movably supported on said member, resilient means to hold said pawl carrier in one position with respect to said member, a pawl pivotally secured to said pawl carrier and engageable with a work piece, and an adjustable stop secured adjacent a work station and engageable with said pawl carrier to limit movement of the latter while permitting greater movement of said member.

2. In a multi-unit machine tool having a plurality of stations at which machining operations are to be performed upon work pieces, said stations being spaced apart distances differing slightly from their correct spacing, means at said stations for locating and clamping said work pieces in position, and indexing means operable to advance a work piece exactly to said stations despite the slight deviations from exact uniformity in their spacing, said means comprising a member having reciprocatory stroke of greater length than the distance between successive stations to which the work piece is to be moved, a pawl carrier movably supported on said member, resilient means to hold said pawl carrier in one position with respect to said member, a pawl pivotally secured to said carrier and engageable with the work piece during the operating stroke of said member, and an adjustable stop secured adjacent a work station and engageable with said pawl carrier to limit movement of the latter while permitting greater movement of said member.

3. In a multi-unit machine tool having a plurality of stations at which machining operations are to be performed upon work pieces, and means at said stations for locating and clamping said work pieces in position, indexing means operable to advance a work piece to one of said stations, said means comprising a movable indexing member, a pawl carrier mounted on said member for movement relative thereto in the direction of movement of the latter, resilient means to hold said pawl carrier in one position with respect to said member, a pawl pivotally mounted on said carrier and engageable with a work piece, and an adjustable stop secured adjacent a work station and engageable with said pawl carrier to limit movement of the latter while permitting greater movement of said member.

4. A machine tool comprising a plurality of units arranged in a row, each of said units having at least one work station, a pair of rest rails extending along said row of units, means at each of the work stations accurately to locate work pieces and clamp them against said rest rails in position for the performance upon them of machining operations by said units, a pair of longitudinally reciprocable indexing rails extending parallel to said rest rails, a plurality of pawl carriers mounted for limited longitudinal sliding movement with respect to said indexing rails, a pawl pivotally mounted on each of said carriers and said pawls being engageable with the work pieces to advance the latter from one work station to the next upon the forward stroke of said indexing rails, adjustable stops adjacent said work stations engageable with said carriers to limit forward movement thereof as said indexing rails approach the end of their forward strokes, and resilient means acting between said carriers and indexing rails resisting movement of said carriers with respect to said indexing rails.

5. An indexing mechanism for machine tools comprising a member movable to and fro, a carrier slidably mounted on said member, an element on said carrier engageable with a work piece to advance the latter to a work station upon the forward stroke of said member and carrier, an adjustable stop at said work station cooperable with said carrier to limit forward movement of the latter, and resilient means opposing movement of said carrier relative to said member.

6. A work piece conveying and indexing mechanism for machine tools, comprising a member for advancing a work piece to a position in which it is to be operated upon by a machine tool, a carrier slidably mounted on said member, an element mounted on said carrier and engageable with a work piece to push the latter to the position in which it is to be operated upon by the machine tool, resilient means operative between said member and said carrier and of sufficient strength to transmit without appreciable flexure a force from said member to said carrier to push the work piece, and a stop to arrest movement of said carrier, said resilient means permitting additional movement of said member after said carrier has been thus arrested.

7. An indexing mechanism for machine tools comprising, a member movable to and fro, a carrier movably mounted on said member, an element on said carrier engageable with a work piece to advance the latter to a work station upon the forward stroke of said member and carrier, a stop at said work station cooperable with said carrier to limit forward movement of the latter, and resilient means opposing movement of said carrier relative to said member.

8. An indexing mechanism for machine tools comprising, a member movable to and fro, a carrier mounted on said member for adjustable sliding movement relative thereto, an element on said carrier engageable with a work piece to advance the latter to a work station upon the forward stroke of said member and carrier, and an adjustable stop at said work station to limit forward movement of the work in an accurately located position for the performance of a machining operation upon it.

ROBERT A. SCHAFER.